(12) United States Patent
Jun et al.

(10) Patent No.: US 7,075,591 B1
(45) Date of Patent: Jul. 11, 2006

(54) METHOD OF CONSTRUCTING INFORMATION ON ASSOCIATE MEANINGS BETWEEN SEGMENTS OF MULTIMEDIA STREAM AND METHOD OF BROWSING VIDEO USING THE SAME

(75) Inventors: Sung Bae Jun, Seoul (KR); Kyoung Ro Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 1003 days.

(21) Appl. No.: 09/666,283

(22) Filed: Sep. 21, 2000

(30) Foreign Application Priority Data

| Sep. 22, 1999 | (KR) | ................................ 1999-41134 |
| Sep. 22, 1999 | (KR) | ................................ 1999-41135 |

(51) Int. Cl.
*G06F 3/00* (2006.01)

(52) U.S. Cl. .......................... 348/700; 725/40; 725/90; 348/716; 348/723

(58) Field of Classification Search .................. 725/90, 725/92, 93, 76, 430, 100, 110, 133, 134; 348/700, 715, 716; 345/723; 707/1, 10, 707/104.1, 2

See application file for complete search history.

(56) References Cited

U.S. PATENT DOCUMENTS

| 5,610,653 | A | * | 3/1997 | Abecassis .................... 348/170 |
| 5,799,310 | A | * | 8/1998 | Anderson et al. ........... 707/102 |
| 5,802,361 | A | * | 9/1998 | Wang et al. ................. 382/217 |
| 5,903,892 | A | * | 5/1999 | Hoffert et al. ................. 707/10 |
| 6,154,771 | A | * | 11/2000 | Rangan et al. ............... 709/217 |
| 6,263,507 | B1 | * | 7/2001 | Ahmad et al. ............... 725/134 |
| 6,266,053 | B1 | * | 7/2001 | French et al. ............ 715/500.1 |
| 6,370,543 | B1 | * | 4/2002 | Hoffert et al. ........... 707/104.1 |
| 6,374,336 | B1 | * | 4/2002 | Peters et al. ................. 711/167 |
| 6,378,132 | B1 | * | 4/2002 | Grandin et al. ............. 725/146 |
| 6,731,314 | B1 | * | 5/2004 | Cheng et al. ................ 345/848 |

FOREIGN PATENT DOCUMENTS

| JP | 04-207878 | 7/1992 |
| JP | 04207878 | 7/1992 |
| JP | 05-030464 | 2/1993 |
| JP | 05-334374 | 12/1993 |
| JP | 09-083955 | 3/1997 |
| JP | 09-212349 | 8/1997 |
| JP | 10-234004 | 9/1998 |
| JP | 11-239322 | 8/1999 |
| JP | 2000-217058 | 8/2000 |
| JP | 2000-253377 | 9/2000 |

* cited by examiner

*Primary Examiner*—Kieu-Oanh Bui
(74) *Attorney, Agent, or Firm*—Fleshner & Kim, LLP

(57) ABSTRACT

Disclosed are a method of constructing information on associate meanings between segments of a multimedia stream, which can describe the cause/effect or abstract/detail relationship between segments of the video streams to efficiently browse the video stream and a method of browsing a video using the same. The present invention defines the cause/effect or abstract/detail relationship between the segments, event intervals, scenes, shots, etc. existing within one video stream or between the video streams, and provides a method of describing the relationship in a data region based on the content of a video stream as well as a method of browsing a video by using the information on the cause/effect or abstract/detail relationship obtained by the aforementioned method. Accordingly, a video browsing on associate meanings is available with easy manipulation and easy access to a desired part, thereby providing an effective video browsing interface for easy browsing of desired segments in a short period of time.

10 Claims, 5 Drawing Sheets

⟶ Effected Link   ---→ Caused Link

⟶ Detailed Link   ---→ Abstracted Link
━━ Interval for Commentary by an Anchor
═══ Interval for Commentary of Detailed News ━━━ Segments to Be Participated for Sub-Graphing Centering Around Segment A

METHOD OF CONSTRUCTING INFORMATION ON ASSOCIATE MEANINGS BETWEEN SEGMENTS OF MULTIMEDIA STREAM AND METHOD OF BROWSING VIDEO USING THE SAME

BACKGROUND OF THE INVENTION

1. Field of the Invention

The present invention relates to a method of describing relationships of cause/effect or abstract/detail between segments of a video stream for effectively browsing the video stream and a method of effectively browsing the video.

2. Description of the Related Art

Owing to the developments of a digital video technology as well as of recognition technologies of image or video, users can now easily search, get access to and browse a desired video or a particular segment of a video. The users can even search the abstracted texts of a video, thereby effectively understanding the entire contents of a video in a short period of time.

There are two methods of abstracting the entire contents of a video. One is a story board-like method of using a key frame. The other is a method of using an abstract stream (highlight).

The method of providing a user with an abstract stream on a video by using a key frame has a limit in its practical applicability. To be specific, providing an excessively small number of key frames makes it difficult for the user to understand the overall video stream and to shift to a desired scene. On the other hand, providing an excessively large number of key frames is likely to undermine the storage space or browsing speed.

To overcome these problems, diverse approaches have been attempted. One of the examples is to hierarchically decompose a video stream and express the same. Another example is to provide a user interface, i.e., to provide a scene transition graph for describing a temporal relationship among scenes so as to easily browse a desired scene only by shifting to the desired scene.

While providing a merit of enabling an effective browsing of a video through description of a temporal relationship among scenes, the scene transition graph fails to provide an effective navigation between segments by using associate meanings between the segments since it provides a shift to a segment only based on temporal relationship.

SUMMARY OF THE INVENTION

To overcome the above problems, an object of the present invention is to provide an effective video-browsing interface, which can easily search/browse desired segments in a short time.

The method of constructing information on relationships of cause/effect or abstract/detail between segments of a multimedia stream according to the present invention is characterized by constructing information on a stream by describing a cause/effect or abstract/detail relationship including the segment locator in a header part or in the midst of a multimedia stream or in a region of contents-based data area having a separate storage structure related to a multimedia stream. The segment locator includes information on an interval notifying the location of a segment. The cause/effect or abstract/detail between located segments is described in the information on description of the relationship.

BRIEF DESCRIPTION OF THE DRAWINGS

The above object and other features of the invention will become more apparent with the following description made with reference to the accompanying drawings, in which.

DETAILED DESCRIPTION OF THE PREFERRED EMBODIMENTS

The following is a detailed description of the preferred embodiments of the present invention made with reference to the accompanying drawings.

Figure 3:
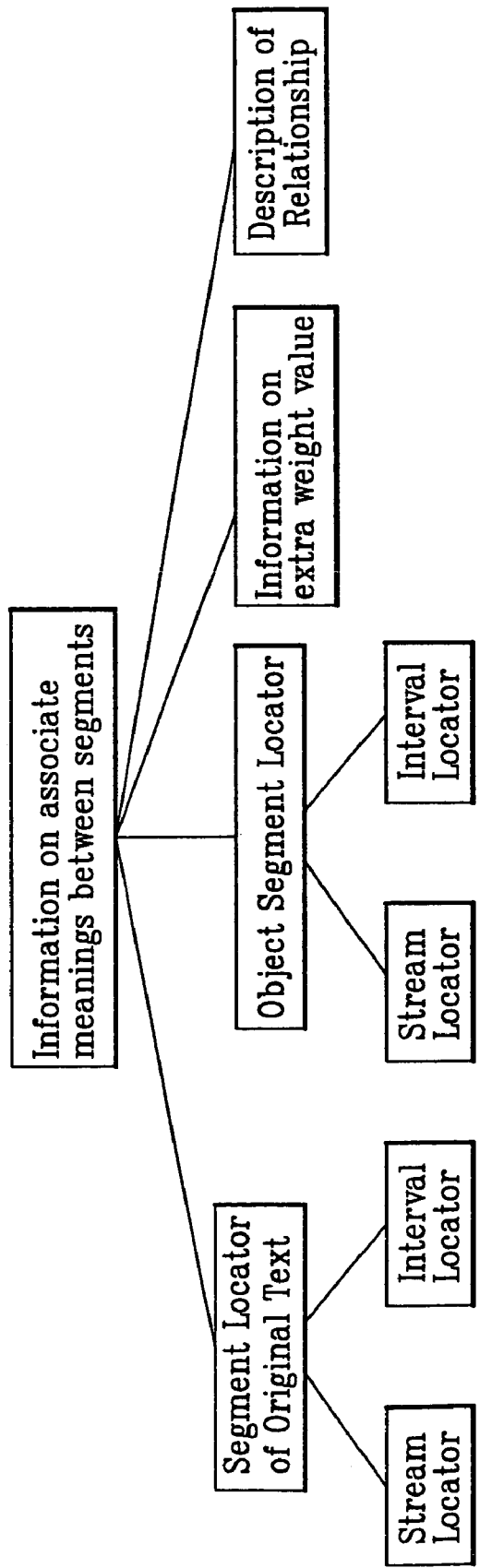
FIG. 3 is a block diagram illustrating a structure of the information on relationship of the cause/effect or abstract/detail between segments according to the present invention.

FIG. 3 is a block diagram illustrating a structure of the information on the cause/effect or abstract/detail relationship between segments according to the present invention. Referring to FIG. 3, the information on the associate meaning between segments is classified into a locator of a subject segment of original text and a locator of an object segment, and comprises information on description of the relationship between the located segment of an original text and the object segment.

The information on associate meaning between segments may further comprise information on extra weight value enabling description of information on extract weight value of the cause/effect or abstract/detail relationship.

The segment of original text, which is the segment locator, and an object segment include information on intervals for discerning the respective locations of each segment as well as the information on stream for locating a stream, to which a segment belongs.

The present invention enables an effective browsing of a multimedia stream by inclusively constructing information on the cause/effect or abstract/detail relationship between segments having the above constitution.

A description will now be provided in further detail for a method of constructing the information with reference to the accompanying drawings.

Figure 1:
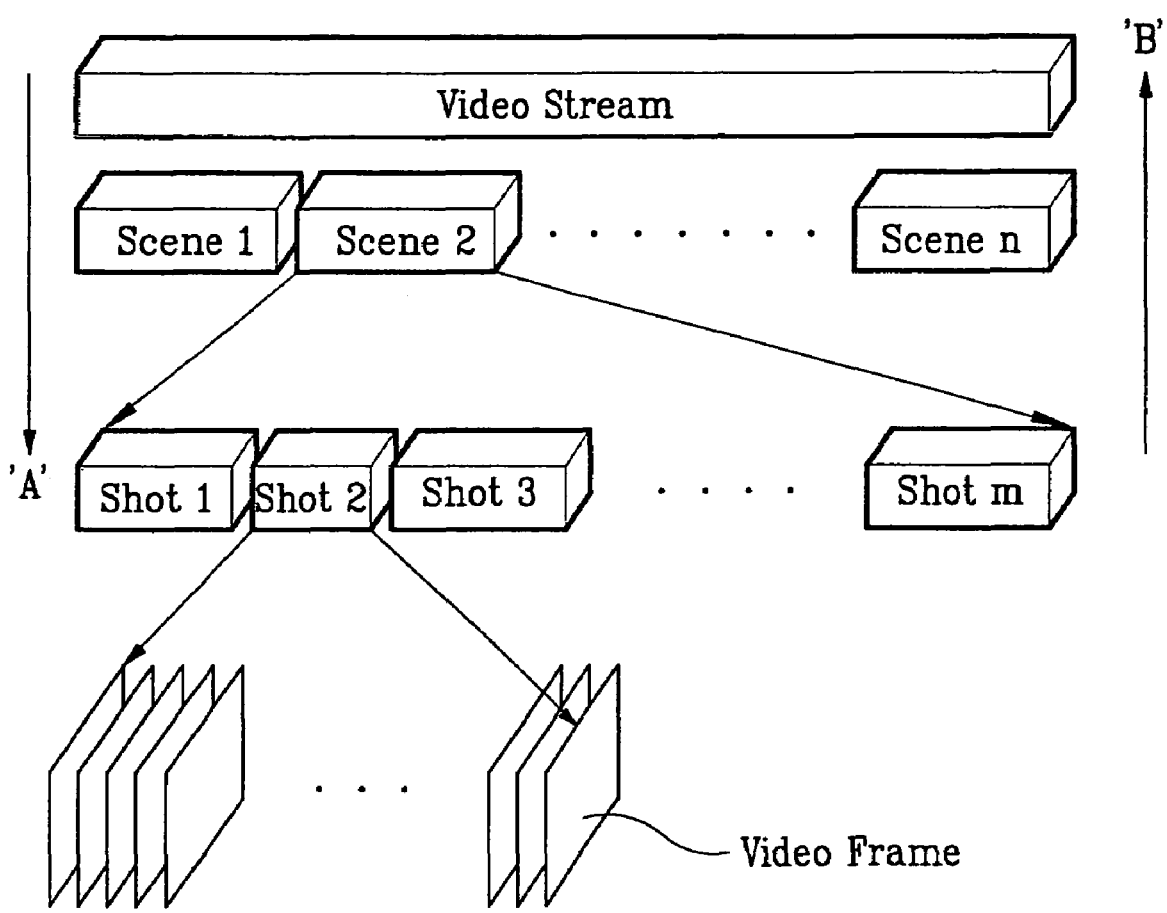
FIG. 1 is a block diagram illustrating a conventional method of hierarchically decomposing a video stream.

The hierarchical decomposition is generally used for analyzing or easily browsing a video, as shown in FIG. 1. Referring to FIG. 1, each video stream is divided into a plurality of scenes, and each scene is also divided into a plurality of shots.

In general, a scene refers to sequence of video images having the same meaning on a logical basis, while a shot refers to an interval consecutively filmed by a camera. The shot can also be considered as a series of frames. The video, scenes and shots described above may be expressed by information on intervals such as a starting/ending point or a starting location/length, including aural information.

A frame may be expressed by an absolute point.

A segment of a video stream is generally considered as a sequence of frams. Aural information may be included in a segment of a video stream when expressed as an interval.

In FIG. 1, the movement toward direction "A" is referred to a shot segmentation, while the movement toward direction "B" is referred to a shot clustering.

Figure 2A:
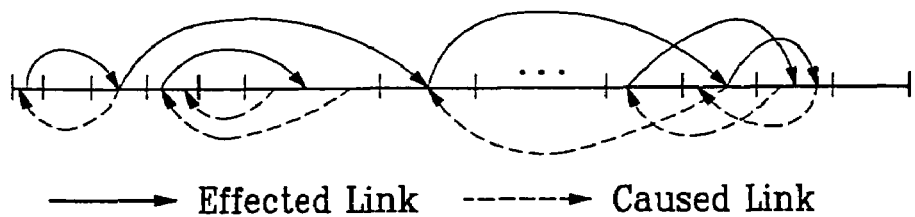
FIG. 2a is a diagram exemplifying a method of expressing cause/effect relationship between segments existing in multimedia contents according to the present invention.
Figure 2B:
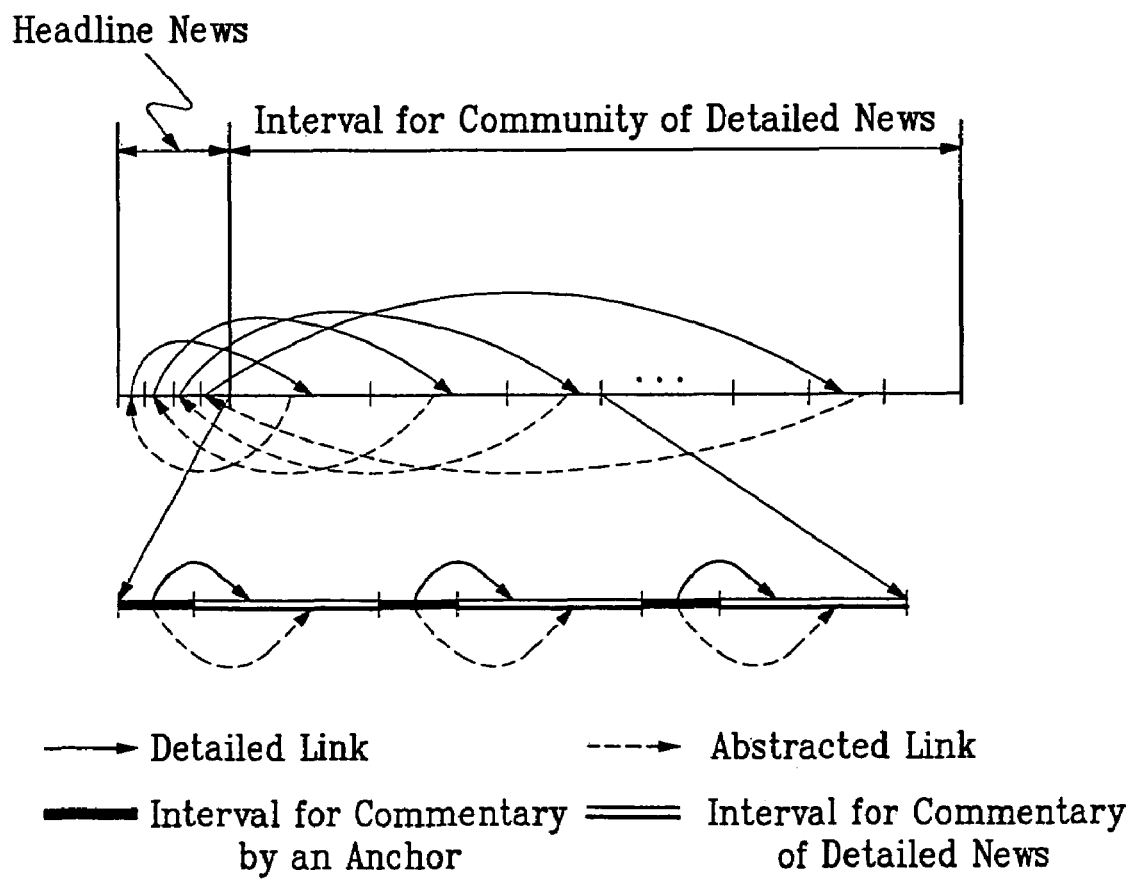
FIG. 2b is a diagram exemplifying a method of expressing abstract/detail relationship existing in news video according to the present invention.

FIG. 2a is a diagram exemplifying a method of expressing cause/effect relationship between segments existing in multimedia contents according to the present invention. FIG. 2b is a diagram exemplifying a method of expressing abstract/detail relationship existing in news video according to the present invention.

Referring to FIG. 2a, the relationship of cause/effect between segments exists in most of a multimedia contents, and is means for easily understanding the story.

Taking an example of such a relationship of cause/effect between segments, a cinema can be generally summarized by the events caused by characters. Assume that, in segment A, character 1 and character 2 cause an event X. As a consequence, character 2 and character 3 cause an event Y. Then, the event X constitutes a cause of the event Y, while the event Y constitutes an effect of the event X.

If such a relationship of the cause/effect between segments or events is provided for the one who is watching a cinema, he or she can easily search for a desired scene and even can understand the entire story in a short period of time.

The cause/effect relationship between segments also exists in the field of sports. Taking a football for example, the scenes between goal-in of the ball and gall ceremony, constitute a cause/effect relationship. The scenes between a player's off-side violation and an umpire's whistling also constitute a cause/effect relationship.

Furthermore, a coach's particular facial expression and a player's violation on the ground also constitute a cause/effect relationship. An event and a character's response thereto with a particular facial expression or a motion when closed up by a camera also constitute a cause/effect relationship.

The cause/effect relationship between segments also exists in the applicable field such as news. A particular event and comments of the event constitute a cause/effect relationship. Influence of event A on event B also constitutes a cause/effect relationship.

The cause/effect relationship also exists between an interview of a citizen's perspective of the event B and an interpretation of the event A. A today's news clip and a critic's description of the social atmosphere in the critics of the news also constitute a cause/effect relationship.

As exemplified above, the cause/effect relationship exists between segments, intervals of an event, scenes and shots in most of a multimedia contents. Therefore, providing means for an effective browsing of such a relationship can be a remedy of easily searching for a part desired by a user of multimedia contents.

Such a relationship of cause/effect can exist not only between segments in the same stream but also between the segments of in logically/physically different streams.

Since automatic indexing is very hard to achieved for most of the cause/effect relationship between segments, manual indexing is preferred.

However, the cause/effect relationship between the segments can be automatically indexed for certain parts in an applicable field of particularity.

The close-up of a particular player, a director or an umpire in a football game, or the scenes of a player's goal-in ceremony or of a public's cheer can be automatically detected by using the characteristics of audio or video. The scenes of goal-in, shooting or whistling can also be automatically detected.

The cause/effect relationship between segments may be automatically abstracted by using the automatically searchable segments.

Referring to FIG. 2(b), news in general includes the headline parts and abstract parts for summarizing main items of the news.

In general, the abstract parts of the news may be located either at the starting point or at the ending point of the news. Detailed comments of the news for commenting the substantial news items by item are also included in the abstract parts.

The abstracted news and detailed news may exist either as a single video stream or as separate video streams.

Assuming that the abstracted news is the headline news, the headline news summarizes several main news items out of the many news items to be commented in the detailed news. If the headline news is closed, each substantial news item is entered.

The substantial news items mostly have a typical structure that each anchor's commentary on news items are located first, and the scenes (episode scenes and reporter's scenes) captured by reporters are located next.

In other words, the abstract/detail relationship exists between the headline news and the detailed news as well as between the anchor's commentary on each news item and detailed commentary of each item.

Assuming that the number of news items introduced in the entire news is "n," and the number of news items introduced in the headline news is "m," the relationship of n☐m is established. Therefore, the headline news can be classified into abstracts of m number of news items.

The headline news part and the detailed news commentary part may be searched by using the method of automatic video segmentation or by a manual work.

If the headline news includes commentary on news item A, the detailed news commentary part also includes the commentary of the news item A. In that case, the abstract/detail relationship exists between the two segments. Thus, the relationship between the two segments can be expressed as shown in the upper part of FIG. 2b.

When using the method of automatic video segmentation or a manual work, the interval of abstracting the news items to be commented by an anchor next time can be distinguished from the interval of showing the actually captured or analyzed scenes in the detailed news commentary part.

A abstract/detail relationship also exists between the segment of abstracting the news items to be commented by an anchor next time and the segment of showing the actually captured or analyzed scenes, as shown in the lower part of FIG. 2b.

The present invention uses the above relationship to construct information on the cause/effect or abstract/detail relationship between segments having the structure as shown in FIG. 3 as information on a multimedia stream.

Each segment having the cause/effect or abstract/detail relationship may exist in the same stream or in separate streams. Therefore, a segment locator is used.

The segment locator has stream locator for locating the streams of two segments having the cause/effect or abstract/detail relationship if the segments exist in two different streams as well as the interval locator for expressing the information on intervals of the segments in a stream.

To express the relationship between segments in the same stream, an interval locator only may be required excluding the stream locator from the original text or the object segment locator. Here, the interval locator is used for explaining the starting location and ending location of the interval, and may be constructed with the information on the starting location and length.

When the cause/effect or abstract/detail relationship between segments is described based on the stream of original text, the stream locator may be omitted from the locator of segments of original text. In order to express the cause/effect or abstract/detail relationship between segments, segment locators of the segments of original text and the object segment. Information on the description of relationship is required for specifying the associate meaning (abstract/detail or cause/effect) between the original and object segment.

Information on additional weight value of the relationship may be additionally required for the purpose of describing the cases when an additional weights among the related segments when one segment associated with a plurality of segments.

Figure 4:
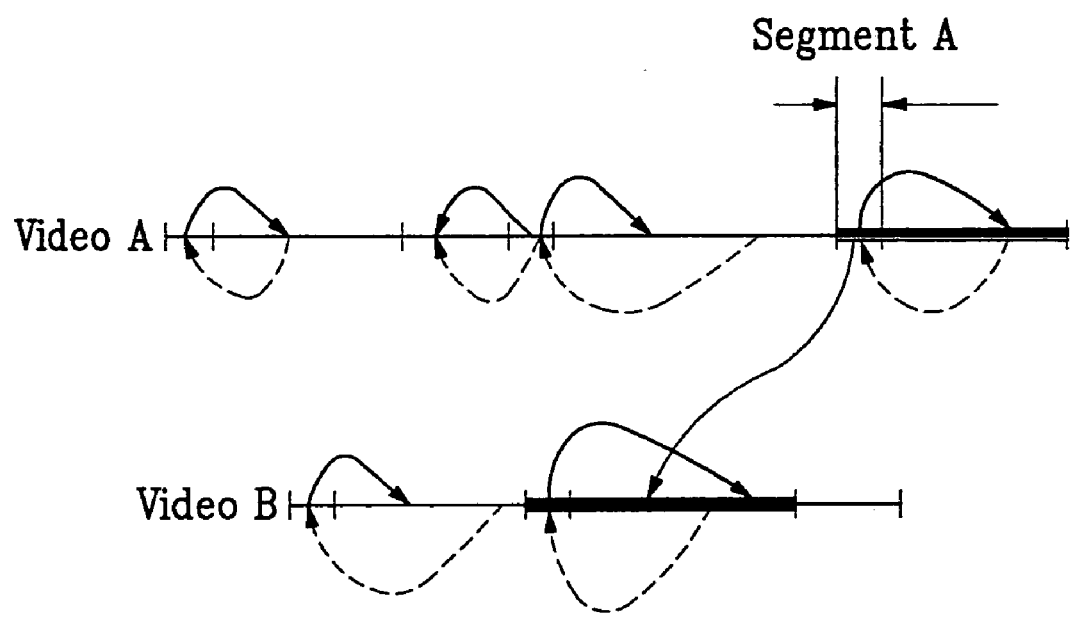
FIG. 4 is a diagram exemplifying a sub-graph for illustrating a relationship of the cause/effect or abstract/detail between segments centering around a segment according to the present invention.

As described above, according to the information on cause/effect or abstract/detail relationship between segments to be described in a data region based on contents of a video stream, a graph can be drawn as in FIG. 4 for the cause/effect or abstract/detail relationship between segments of a video stream, event intervals, scenes and shots. FIG. 4 is an example of a graph showing the cause/effect or abstract/detail relationship centering around the segment A.

The graph in FIG. 4 may be or may not be a graph considering the temporal order of the intervals between segments in a stream.

The present invention also provides a method of browsing to abstract a desired part by constructing a sub-graph from the information on link centering around the desired segment from the graph, as shown in FIG. 4.

The cause/effect or abstract/detail relationship between segments described above exists not only in the news but also in the videos in general (dramas, documentaries, sports, etc.) Therefore, the present invention provides a method of browsing the desired part by using the graph.

Therefore, a browsing method for abstracting a desired part only can be provided with by the present invention by using the cause/effect or abstract/detail relationship between segments of a multimedia stream. The browsing method using the cause/effect or abstract/detail relationship between segments of a multimedia stream is characterized by a video browsing interface including a video display view and a key frame or a key region view. The video browsing interface further includes a region indicating the cause/effect or abstract/detail relationship between segments of a multimedia stream by using the information on the cause/effect or the abstract/detail relationship between the segments. Further, the interface enables a video browsing by using the region indicating the cause/effect or abstract/detail relationship between segments.

Figure 5:
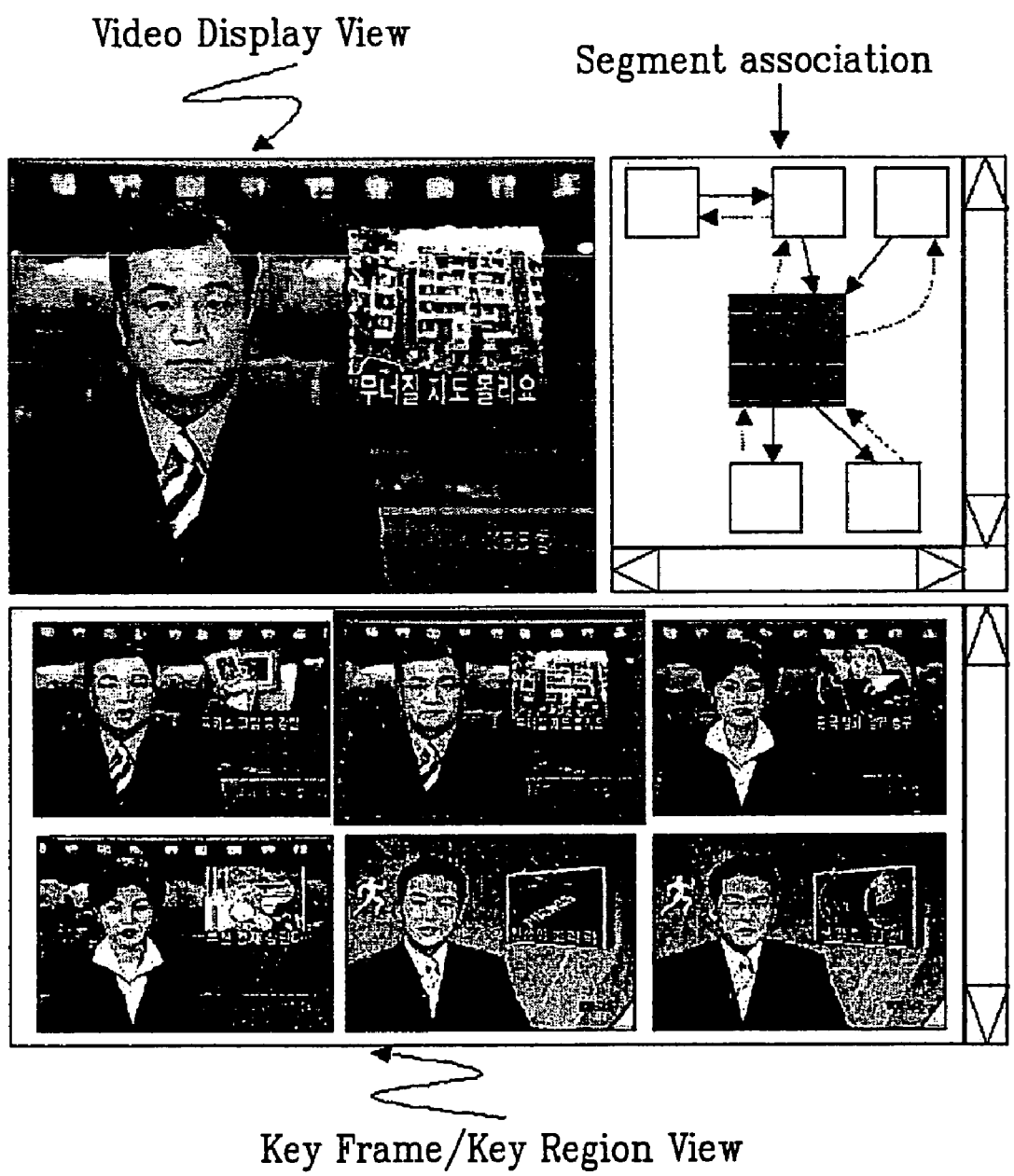
FIG. 5 is a diagram illustrating a video-browsing interface using the information on relationship of the cause/effect or abstract/detail between segments according to an embodiment of the present invention.

FIG. 5 shows an embodiment of the video-browsing interface using the cause/effect or abstract/detail relationship between segments according to the present invention.

Referring to FIG. 5, the video-browsing interface is divided into three parts of a video display view, a key frame/key region view and a segment association view. The video display view corresponds to a part to display moving images and serves as the function of a video display view in a general video player. The key frame/key region view is a view providing a window for understanding the entire story of a video or shifting toward a desired location of the scene to the user to display the key frame or key region for the purpose of abstracting the video. The segment association view indicates the cause/effect or abstract/detail relationship view between segments by using a text or graphic factors centering around a selected video segment, thereby enabling an efficient video browsing through easy shift to a desired location by selecting a specific part.

In the video-browsing interface suggested by the present invention, although the key frame/key region view exists in another video-browsing interface, the present invention provides an additional function to enable browsing by using the cause/effect or abstract/detail relationship between segments. Moreover, the segment association view enables an easier video navigation by schematizing the information on the cause/effect or abstract/detail relationship between segments.

Accordingly, the user can browse a desired video by using a control function and shift to the desired location by selecting a specific image (frame or region) in the key frame/key region view.

The conventional art provides a function enabling a shift to the segments represented by the corresponding key frame or key region. However, the present invention provides a video navigation with the following three manners when a key frame or a key region is selected by using the information on the cause/effect or abstract/detail relationship between segments.

That is, the present invention provides a function such as, when the user selects a particular region of the key frame or key region as in the conventional art, a shift can be made to an interval explaining the cause of the representative segment or an interval explaining the effect of the representative segment of the key frame or the key region. A shift can also be made to a detail or an abstract part of the representative segment. That is, when the user selects a particular region of the key frame/key region view, a path selection will be asked as described above, and a shift is made according to the user's selection.

The user may easily shift to a desirable location after selecting the key frame or the key region and then selecting the kind of shifting.

The key frame/key region view can be displayed in one-dimensional arrangement of the frames and displayed in a tree structure or a graph structure. The segment association view is a part expressing the cause/effect or the abstract/detail relationship suggested by the present invention and taking actions according to an input by the user. The segment association view expresses the cause/effect or abstract/detail relationship between segments as a node and a link based on the segments centering around the segment selected by current user or the segment displayed on the display view.

Each node refers to a segment and is displayed by using the key frame, the key region or the text, etc. The link refers to the cause/effect or abstract/detail relationship between segments.

According to the interface of the present invention, the user can easily perform navigation to the corresponding segment by selecting the node or the link.

Accordingly, the user can browse by making a desired video sequence or demand a consecutive play by selecting the node or the link from the cause/effect or abstract/detail relationship graphic view or by selecting the desired part only.

The cause/effect or abstract/detail relationship graphic view is normally displayed in a graphic format and may be displayed as a one-dimensional view or in a tree structure, if necessary.

The user can determine a range to be displayed on the cause/effect or abstract/detail relationship graphic view, and may demand a cause/effect or abstract/detail relationship graphic view for the entire video. The user may also demand a display of the segments related to the currently selected segments only, or a link from the selected segment to the further several steps.

The cause/effect or abstract/detail relationship according to the present invention also enables a video browsing by using various interfacing manners in addition to the interface shown in FIG. 5.

Further, using the number of links centering around each node (segment) enables an automatic acquisition of information on major segments of the entire story. Accordingly, it is possible to provide the user with information rearranged by major segments or in temporal order.

As described above, the present invention provides a method of defining the cause/effect or abstract/detail relationship between segments of a video, which can be described on a data region based on contents of the video, and suggests an effective material structure for description of the relationship. The present invention also provides an effective browsing method using the same.

The present invention also enables a much more powerful assistance than the conventional video navigation using a key frame or a key region.

The present invention also provides an effective navigation method between segments existing in separate streams having the cause/effect or abstract/detail relationship by describing the cause/effect or abstract/detail relationship existing not only in the logically/physically same stream but also in different streams.

The present invention provides a basic material structure applicable not only to the news but also to most of the videos such as dramas, documentaries, sports, shows, etc., thereby suggesting a method for constructing an application suitable to each contents.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of browsing a video using semantic relations information between segments of a multimedia stream characterized by a video browsing interface including a video display view and a key frame or a key region view, the method comprising:

displaying the semantic relations information between segments by the video browsing interface further including key frames or key regions or text for displaying the semantic relations information between the segments; and performing a video browsing by using key frames or key regions or text displaying the semantic relations information between segments, wherein the semantic relations information between segments is an information on cause/effect or abstract/detail relationships.

2. The method of claim 1, wherein a user can select a case as to whether to shift to a frame corresponding to the selection region or to a segment represented by the selected region, or to a cause segment of the corresponding segment or to an effect segment or to an abstract segment or to a result segment, if the user selects a predetermined display region of the key frame or the key region view.

3. The method of claim 1, wherein each segment is expressed by a node, and the relationship between the segments is expressed by a link in a region displaying the semantic relations information between segments.

4. The method of claim 3, wherein each node is expressed by using the key frame, the key region or a text in the region displaying the semantic relations information between segments.

5. The method of claim 3, wherein the corresponding node and the link are displayed in a graphic structure in the region displaying the semantic relations information between segments.

6. The method of claim 3, wherein the corresponding node and the link are displayed in a tree structure in the region displaying the semantic relations information between segments.

7. The method of claim 3, wherein the corresponding node and the link are displayed in other structures than a graphic structure or a tree structure in the region displaying the semantic relations information between segments, the corresponding segment and the segments related to the semantic relations being dynamically converted and displayed when a predetermined segment is selected.

8. The method of claim 3, wherein a shift is made to a corresponding segment if each node of a graphic view of semantic relations information is selected.

9. The method of claim 1, wherein the region displaying the semantic relations information displays the region displaying the semantic relations information between segments centering around a segment currently being displayed.

10. The method of claim 1, wherein a graphic view displays the semantic relations information and includes a plurality of nodes, and the segment corresponding to a selected node are automatically linked and reproduced.

* * * * *